United States Patent
Eickenhorst

[15] 3,704,775
[45] Dec. 5, 1972

[54] WORKPIECE TRANSFER MECHANISM
[72] Inventor: Frank C. Eickenhorst, Mason, Ohio
[73] Assignee: The Minster Machine Company, Minster, Ohio
[22] Filed: Sept. 14, 1970
[21] Appl. No.: 71,670

[52] U.S. Cl. ...............................................198/218
[51] Int. Cl. ..........................................B65g 25/04
[58] Field of Search...............................198/218, 19

[56] References Cited

UNITED STATES PATENTS

| | | | |
|---|---|---|---|
| 3,428,166 | 2/1969 | Burke | 198/218 |
| 3,262,541 | 7/1966 | DeGain | 198/218 |
| 3,430,782 | 3/1969 | Henkel | 198/218 |

*Primary Examiner*—Richard E. Aegerter
*Attorney*—Jeffers and Rickert

[57] ABSTRACT

The specification discloses a workpiece feeding device for advancing workpieces step by step from an incoming station into a plurality of work stations and then to an outgoing station. The device has frame members reciprocable in the direction of movement of the workpieces and movably carried by the frame members are workpiece engaging elements arranged in opposed relation and movable toward each other to engage workpieces and away from each other to release workpieces. The feeding device is particularly adapted for use with a mechanical press and is arranged to be driven by the press crankshaft so as to operate in timed relation to the movement of the press slide.

12 Claims, 13 Drawing Figures

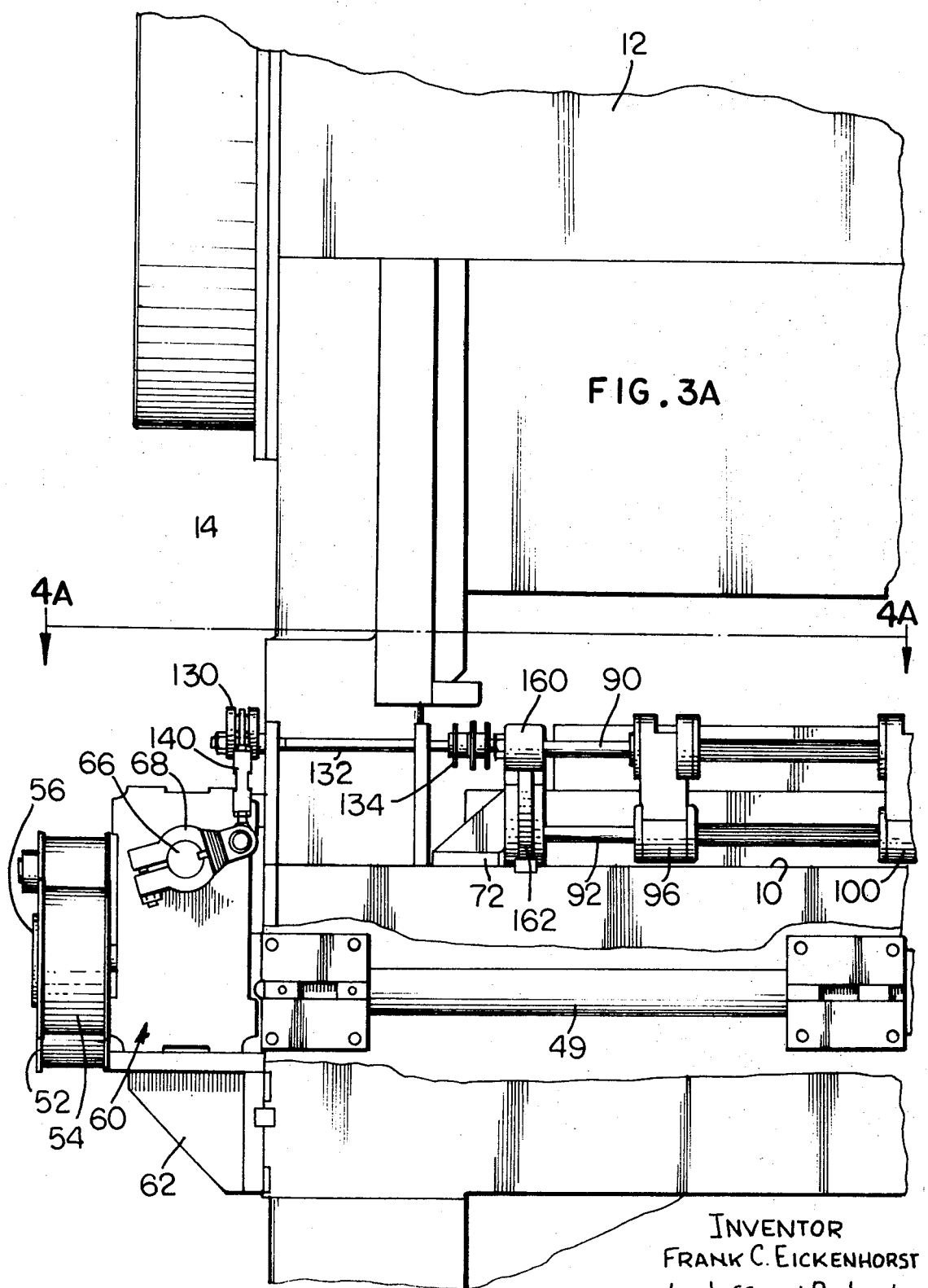

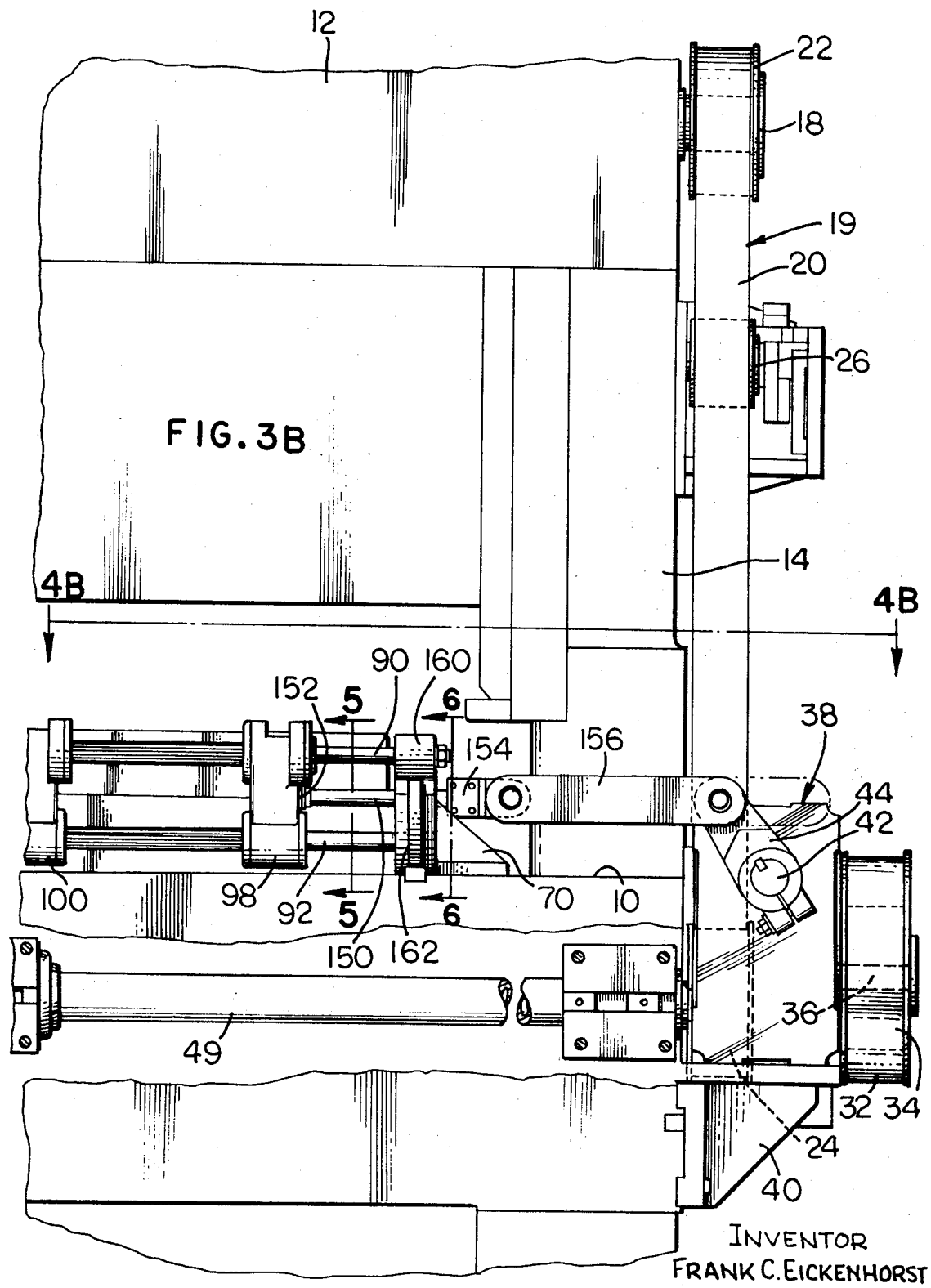

INVENTOR
FRANK C. EICKENHORST
by Jeffers & Rickert
Attorneys

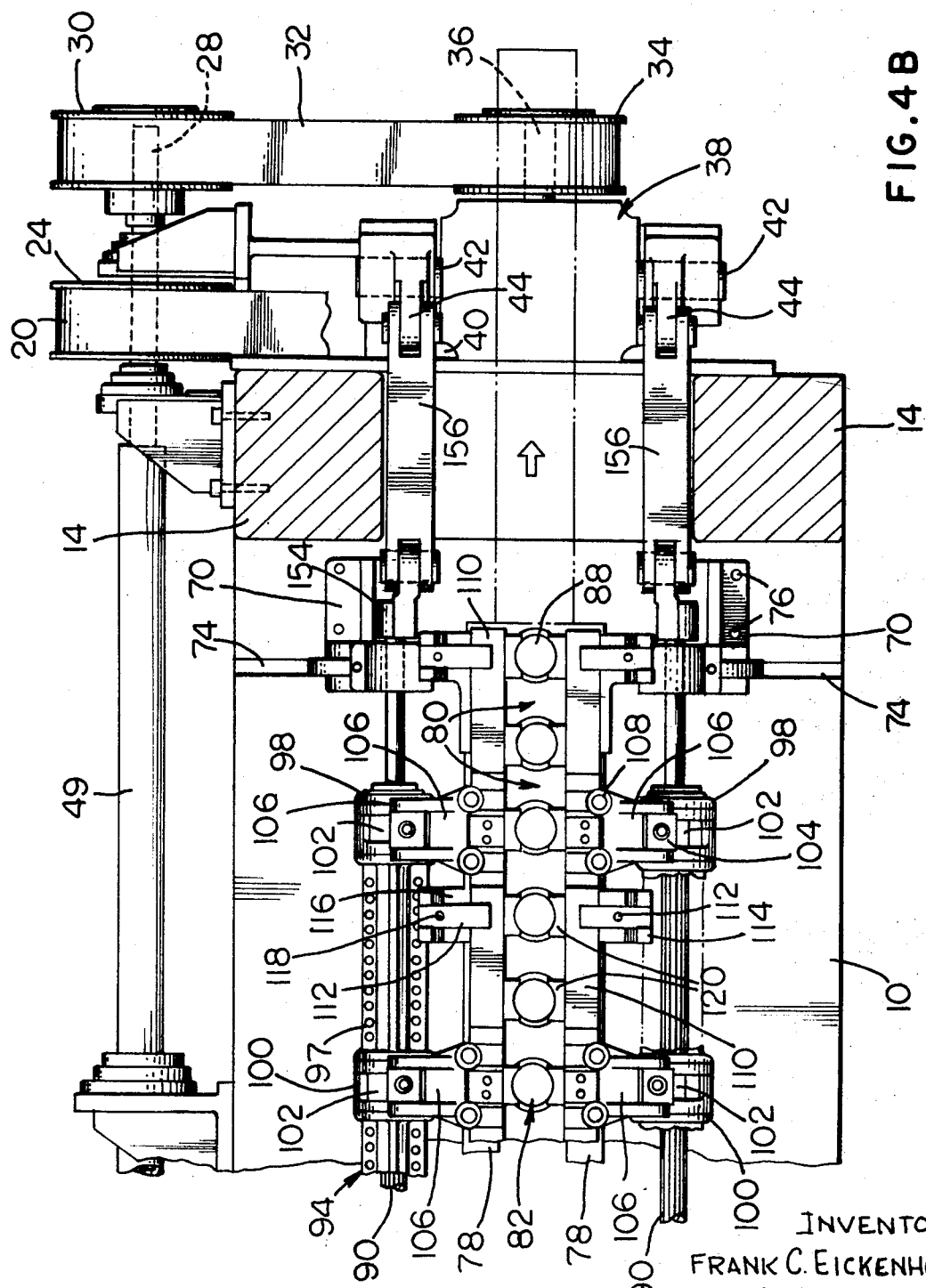

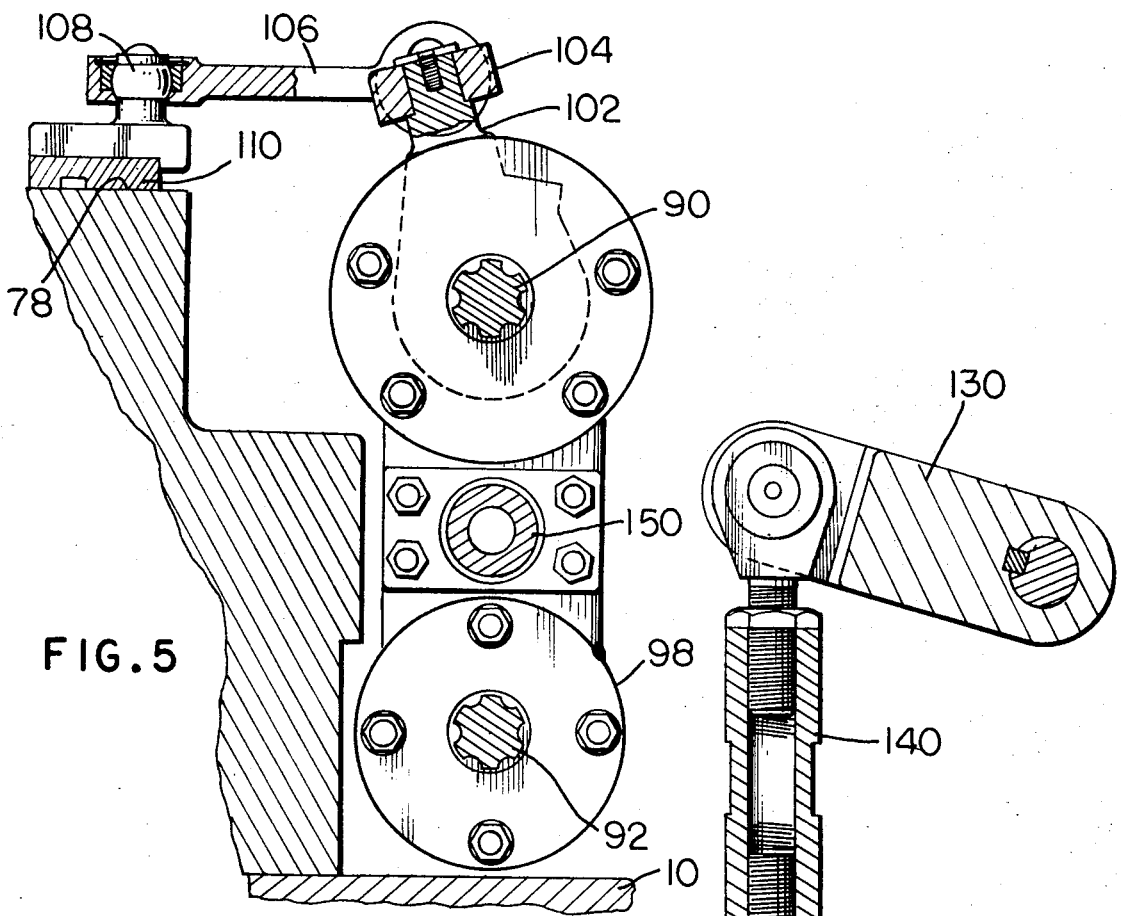
FIG.5
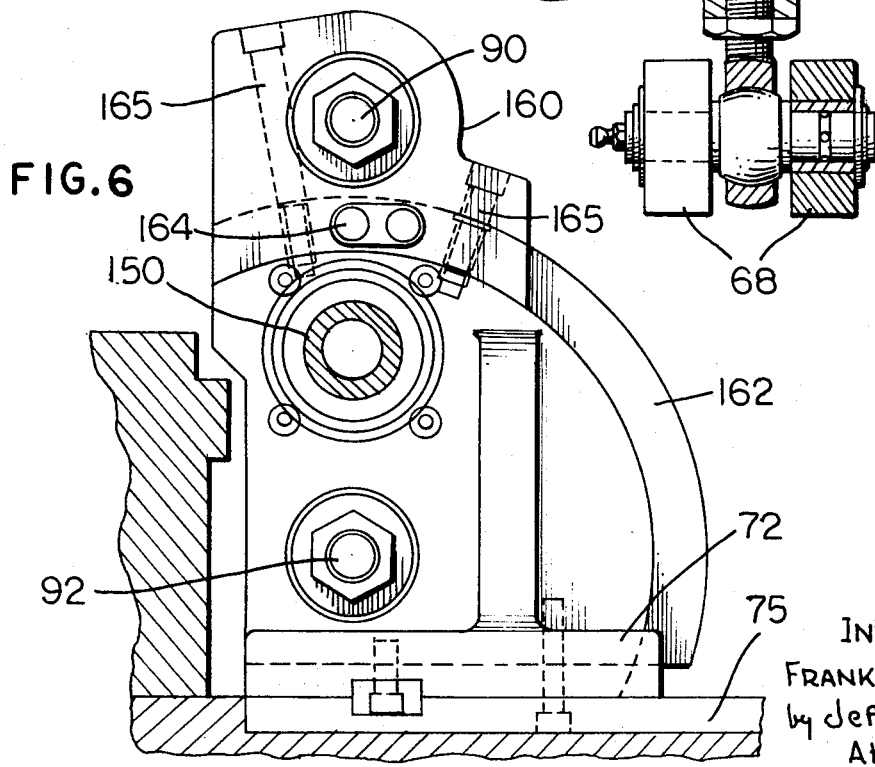
FIG.6
FIG.7
INVENTOR
FRANK C. EICKENHORST
by Jeffers & Rickert
Attorneys

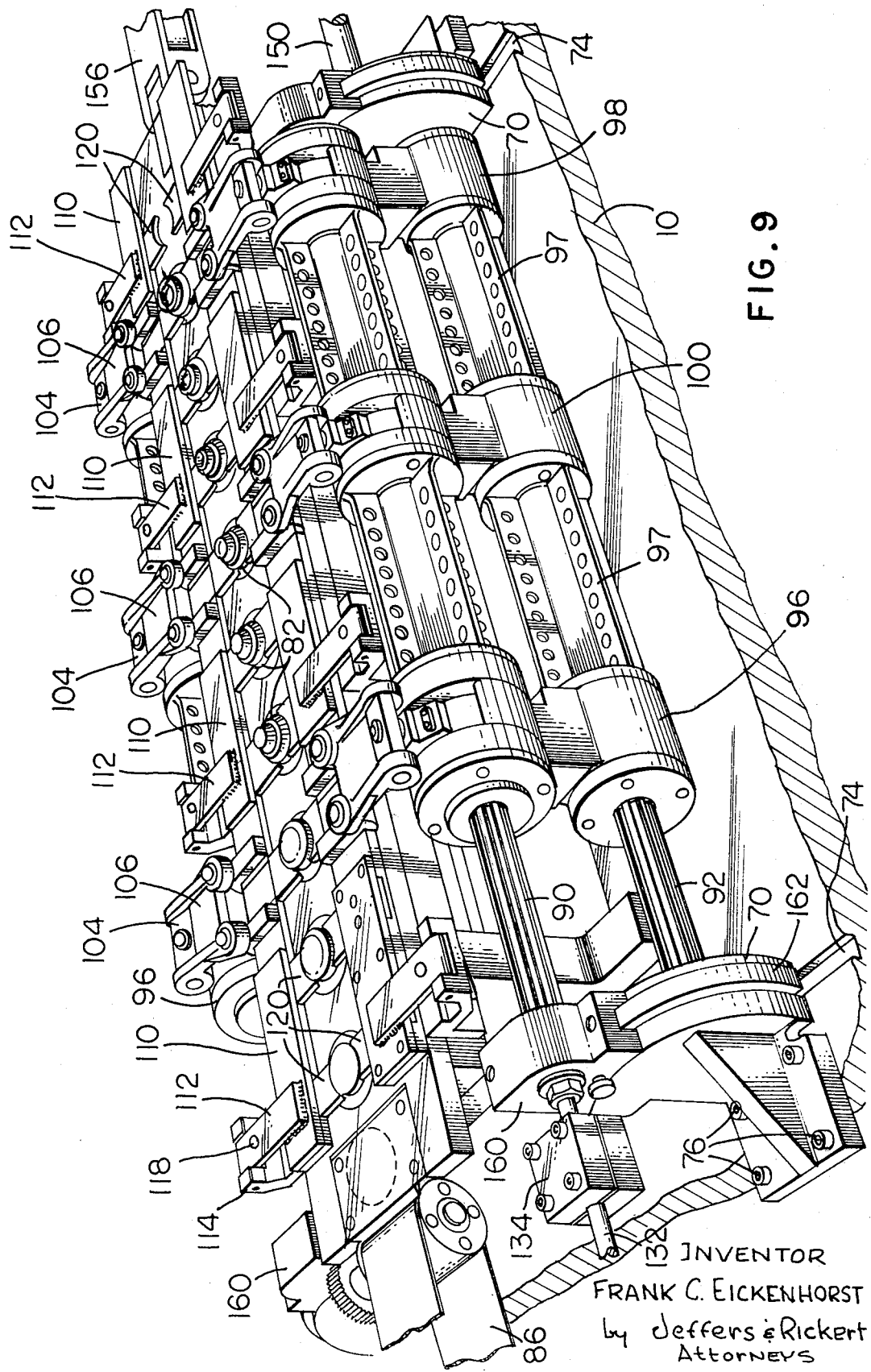

WORKPIECE TRANSFER MECHANISM

BACKGROUND OF THE INVENTION

The present invention relates to a feed device for a machine such as a press, in particular a mechanical press, and is especially concerned with a feed device for advancing workpieces step by step to a plurality of work stations in succession.

Many workpieces are best formed by passing the workpieces through a series of work stations in succession arranged in the working area of a single tool or machine such as a press. Such work stations, or die arrangements, are referred to as progressive dies because the workpiece usually starts as a strip of stock or blank and progressively assumes finished shape as it passes through the work stations in succession.

In many cases, in connection with press work, a strip of stock is fed from a supply thereof and several operations are performed on the strip, usually commencing with blanking and piercing operations and with forming operations following while the workpiece remains attached to the edge portions of the strip. With the workpieces so attached to the edge portions of the strip, the locating of the workpieces in the successive die stations is somewhat simplified because the spacing between the workpieces is always the same and it is only necessary to advance the strip a predetermined amount following each operation to advance the workpieces connected thereto the next following work station.

However, it is many times not expedient, or possible, to keep a workpiece attached to an edge portion of the strip and it is even preferable in some cases to supply the workpieces to the progressive die in the form of individual blanks which may be at least partially formed. By supplying the workpieces as individual parts, the operations that are to be carried out thereon are completely free of any interference with the edge portions of a strip of material and more flexibility is possible in the nature of the work operations that can be carried out.

It is in connection with a feeding device for feeding individual workpieces in such a progressive die arrangement that the present invention is particularly concerned.

A primary object of the present invention is the provision of a workpiece feeding arrangement which will handle individual workpieces and move the workpieces step by step from an incoming station to a plurality of work stations in succession and then to an outgoing station, while at all times accurately positioning the workpieces in the several stations.

Another object of the present invention is the provision of a feeding device of the nature referred to which is so constructed that a relatively small mass is required to be moved during operation of the deice thereby permitting the device to be operated at high speed.

A still further object of the present invention is the provision of a feeding device of the nature referred to which is so arranged that the work stations along which the device moves the workpieces can readily be exposed without dismantling the entire feeding device.

It is also an object of the present invention to provide a feeding device of the nature referred to in which lost motion between relatively movable parts is kept to a minimum thereby permitting accurate control of the movements of the various parts of the feeding device.

It is also an object of the present invention to provide a feeding device of the nature referred to in which the movements of the various parts are synchronized and correlated so that workpieces can be engaged and conveyed and released by the device while being accurately positioned at all times.

The foregoing objects as well as still other objects and advantages of the present invention will become more apparent upon reference to the following detailed specification taken in connection with the accompanying drawings in which:

FIG. 3A is a view looking in at the press from the front, which is the left side of FIG. 1, and showing about the left hand half of the press and feeding device;

FIG. 3B is a view like FIG. 3A, looking in at the front of the press, but showing the right hand half of the press and feeding device;

FIG. 4B is a plan sectional view indicated by line 4B—4B on FIG. 3B;

FIG. 5 is a fragmentary vertical sectional view indicated by line 5—5 on FIG. 4B;

FIG. 6 is a fragmentary vertical sectional view indicated by line 6—6 on FIG. 3B;

FIG. 7 is a view drawn at enlarged scale and showing an adjustable link forming a part of one of the drives for the feeding device;

FIG. 9 is a perspective view showing the general arrangement of the feeding device as seen from the left front corner.

SUMMARY OF THE INVENTION

Figure 1:
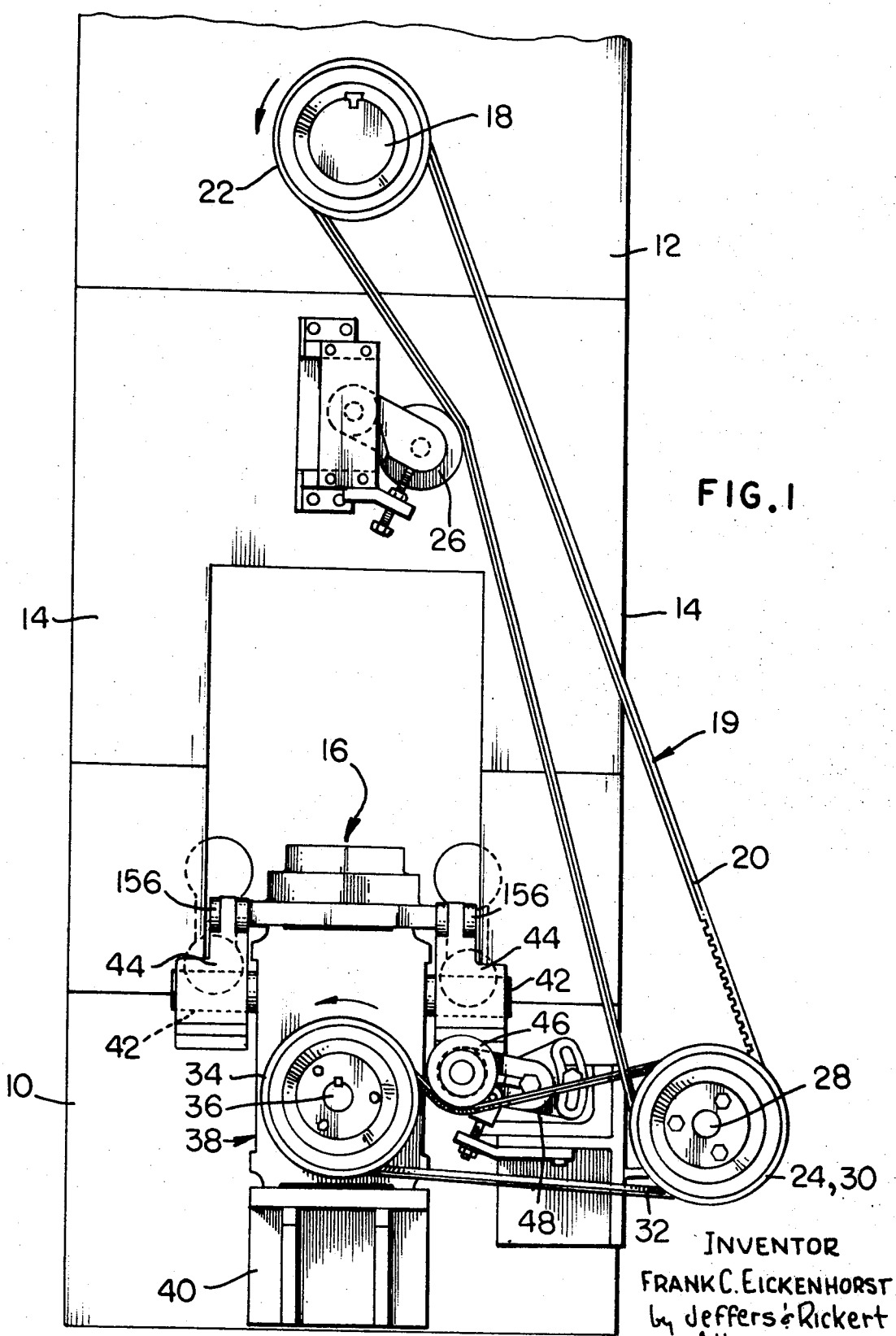
FIG. 1 is a view looking in at one side of a press having a feeding device according to the present invention.

The feeding device of the present invention comprises a main frame adapted for being mounted in the working space of a press and having frame members guided thereon for reciprocation on opposite sides of, and parallel to, a path along which the incoming station of the press and the row of work stations and the outgoing station are arranged.

Each frame member has connected thereto a plurality of workpiece engaging elements arranged along one side of the row of work stations at the same spacing as the stations and opposed to the corresponding elements on the other frame member. Driving devices are connected to the frame members for causing reciprocation thereof parallel to the aforementioned path and for reciprocating the workpiece engaging elements toward each other to engage workpieces therebetween and away from each other to release workpieces from therebetween.

The frame members reciprocate between end positions spaced apart the same distance as the stations and reciprocation of the workpiece engaging elements on the frame members laterally of the path occurs in the respective end positions of the frame members.

The workpiece engaging elements are connected to carriers which can be swung outwardly away from the path along which the work stations are distributed to expose the work stations when necessary while each frame member together with the adjacent workpiece engaging elements can be swung outwardly away from the said path for even greater exposure of the work stations.

Separate drives are provided for reciprocating the frame members parallel to the path and for moving the workpiece engaging elements laterally of the path and a further drive arrangement is arranged in interconnecting relation thereto to cause the reciprocation of the frame members and the movement of the workpiece engaging elements to take place in fixed timed relation to each other.

The feeding device is especially adapted for use with a mechanical press and is arranged to receive motive power from the crankshaft of the press for carrying out one complete workpiece advancing cycle for each rotation of the press crankshaft.

DETAILED DESCRIPTION

Referring to the drawings somewhat more in detail, and particularly to FIGS. 1, 2, 3A, 3B, 4A and 4B, the press with which the device is used will be seen to comprise bed 10 and a head 12 and uprights 14 extending therebetween. Mounted on bed 10 in the working space of the press is a feeding device according to the present invention and generally indicated at 16.

The feeding device is adapted for receiving motive power from crankshaft 18 mounted in the press head via a slip free flexible drive 19 (FIGS. 1 and 3B) which might consist, for example, of the toothed belt 20 running over the toothed pulley 22 on the crankshaft 18 and a toothed pulley 24 on the feeding device and maintained taut by an idler pulley 26 running on the back of the belt on the slack reach thereof and advantageously mounted on the adjacent upright.

Pulley 24 is mounted on a shaft 28 which carries at one end a further pulley 30 (FIGS. 1, 3B and 4B). Pulley 30 is also toothed and is engaged by a toothed belt 32 which is entrained about a still further toothed pulley 34 on the input shaft 36 of a drive unit designated at 38 and mounted at one end of the press bed as on a supporting bracket 40 (FIGS. 1, 3B and 4B).

As will be seen in FIGS. 1, 3B and 4B, drive unit 38 has an output shaft 42 which oscillates in response to rotation of input shaft 36. Connected to shaft 42 at opposite sides of drive unit 38 are the arms 44 which will also oscillate in response to rotation of input shaft 36. An idler pulley 46 which is carried on the press bed, as on a bracket 48, engages the back side of the slack reach of toothed belt 32.

Figure 4A:
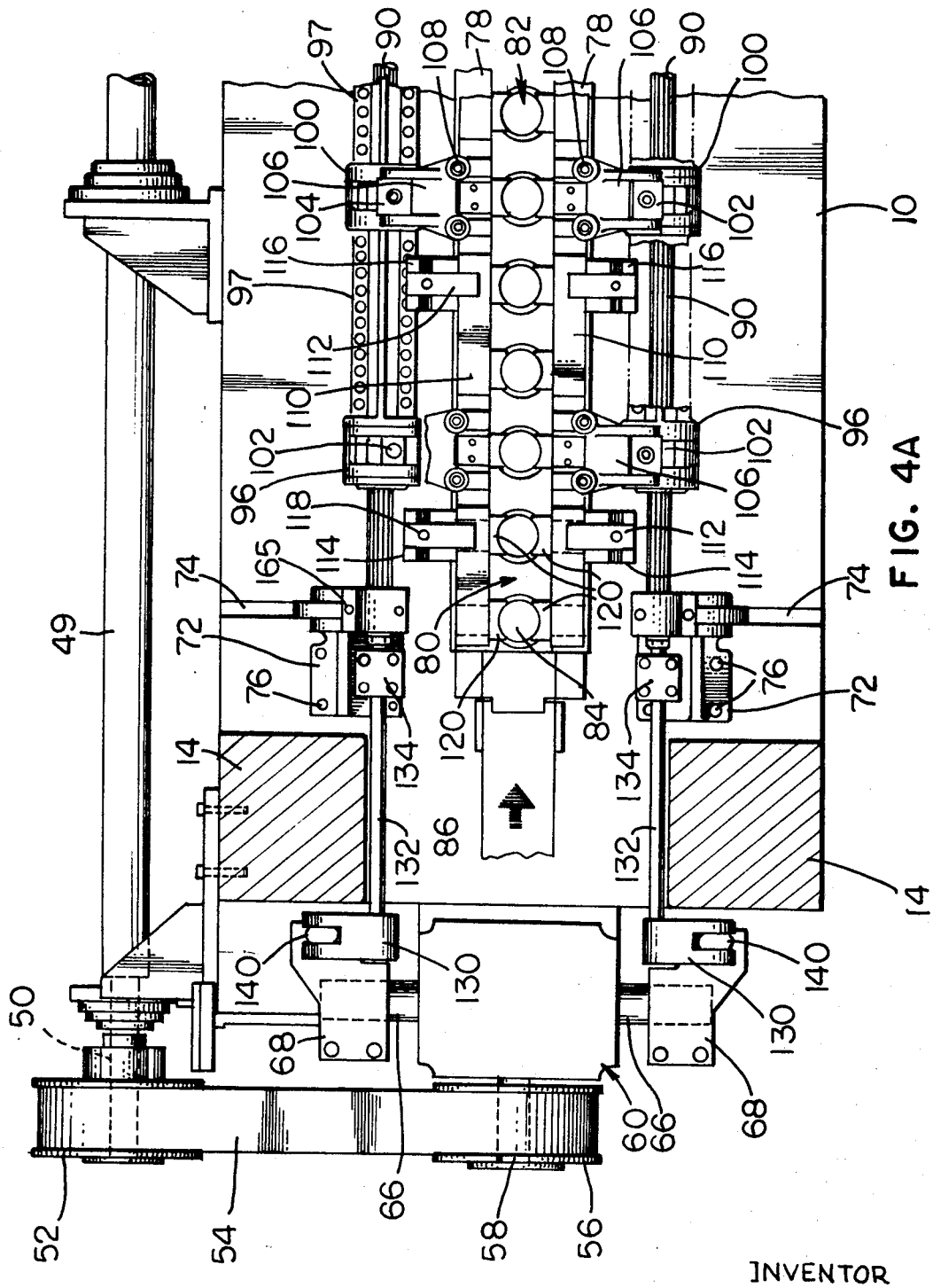
FIG. 4A is a plan sectional view indicated by line 4A—4A on FIG. 3A.

Shaft 28 on which pulleys 24 and 30 are mounted extends in the transverse, or side to side, direction of the press and preferably has a tubular section 49 connected thereto for the purposes of rigidity and lightness. At the side of the press opposite pulleys 24 and 30, the tubular section 49 is connected to another shaft 50 on which is mounted a toothed pulley 52 (FIGS. 3A and 4A).

Figure 2:
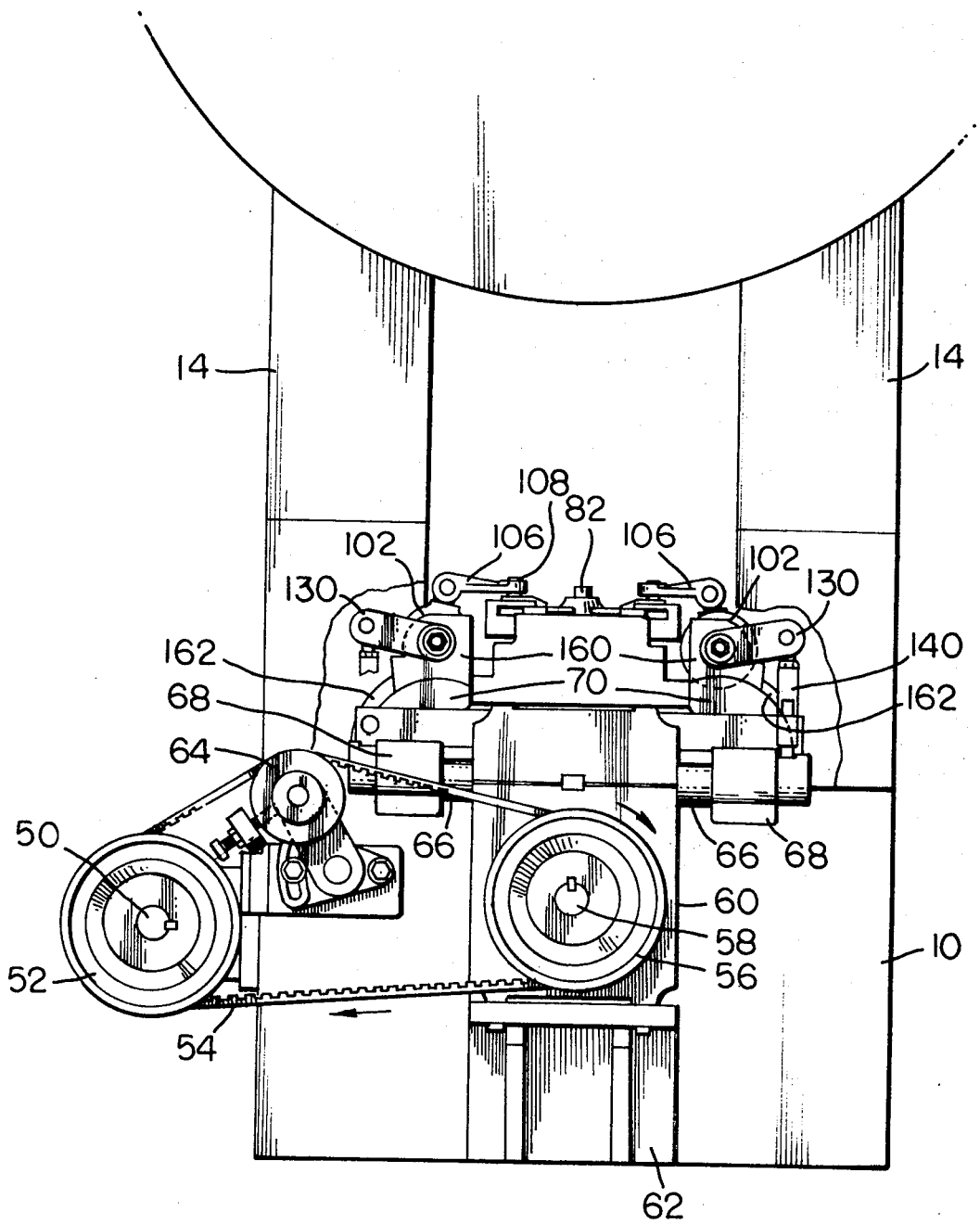
FIG. 2 is a view looking in at the other side of the press.

As will best be seen in FIG. 2, toothed pulley 52 has another toothed belt 54 entrained thereabout which also passes about a toothed pulley 56 on input shaft 58 of another drive unit 60 mounted on the end of the press bed, as by supporting bracket 62.

Still another idler pulley 64 is carried by the press bed and engages the slack reach of belt 54, in this case, on the inside thereof as a matter of convenience.

Drive unit 60 has an output shaft 66 extending transversely therethrough on the opposite ends of which are mounted the arms 68. Shaft 66 and arms 68 will oscillate in response to rotation of input shaft 58.

At this point it will be apparent that power is derived from the crankshaft of the press and delivered to the feed unit via a first drive consisting of drive unit 38 and a second drive consisting of drive unit 60. A third drive consisting of shafts 28, 49 and 50 and the toothed pulleys and belts pertaining thereto positively interconnects the first and second drives so that the drives for the feed unit run in timed relation to each other and in timed relation to rotation of the press crankshaft.

The feed unit utilizes the press bed 10 and bolster 11 as its main frame. Frame members 70 (FIG. 4B) are mounted on the press bed at one side of the working space of the press, and frame members 72 are mounted on the press bed on the other side of the working space thereof (FIGS. 3A, 3B, 4A and 4B). The frame members 70 and 72 are located in fixed spaced relation to each other and are keyed to angularly related keyways 73 and 74 in the press bed and are clamped in place by the cap screws 76 extending through the blocks and into the press bed. The keyways 73 and 74 and the keys 75 therein will be seen in FIGS. 8A and 8C.

The main frame of the unit also comprises a bolster arrangement 11 secured to the press bed 10 and comprising upwardly facing rail regions 78 (FIGS. 4A and 4B) extending in parallel spaced relation in the side to side direction across the bed and on opposite sides of a die space generally designated at 80. The rail regions 78 may be integral with a bolster member or may be formed on separate parts which are preferably interconnected by frame members therebeneath which are, in turn, bolted to the press bed or bolster.

As will be seen in FIGS. 4A and 4B, in the space 80, and arranged in a line, or along a path, parallel to rail regions 78 are the dies forming the work stations 82 in predetermined longitudinally spaced relation. At one end of the row of work stations is an incoming station 84 to which workpieces in the form, for example, of blanks to be processed are supplied by an incoming conveyor such as belt 86 while at the opposite end of the row of work stations is an outgoing station 88 which may communicate with a workpiece receiver via a chute or the like.

Incoming station 84 and outgoing station 88 are spaced from the next adjacent work stations the same distance that the work stations are spaced from each other.

Extending between frame members 70 and 72 on each side of the path represented by space 80 are guide means in the form of superimposed shafts 90 and 92 which are parallel with each other and also parallel with the aforementioned space 80 (FIGS. 4A, 4B, 8A and 8B). Both of the shafts are rotatably carried in the frame members 70 and 72 by antifriction bearings 91 and 93 (FIG. 8C) and each pair of shafts together form a guide way for frame members 96, 98 and 100 (FIG. 8B) on the respective side of the path. Each frame member is reciprocable longitudinally along the respective pair of shafts.

Figure 8A:
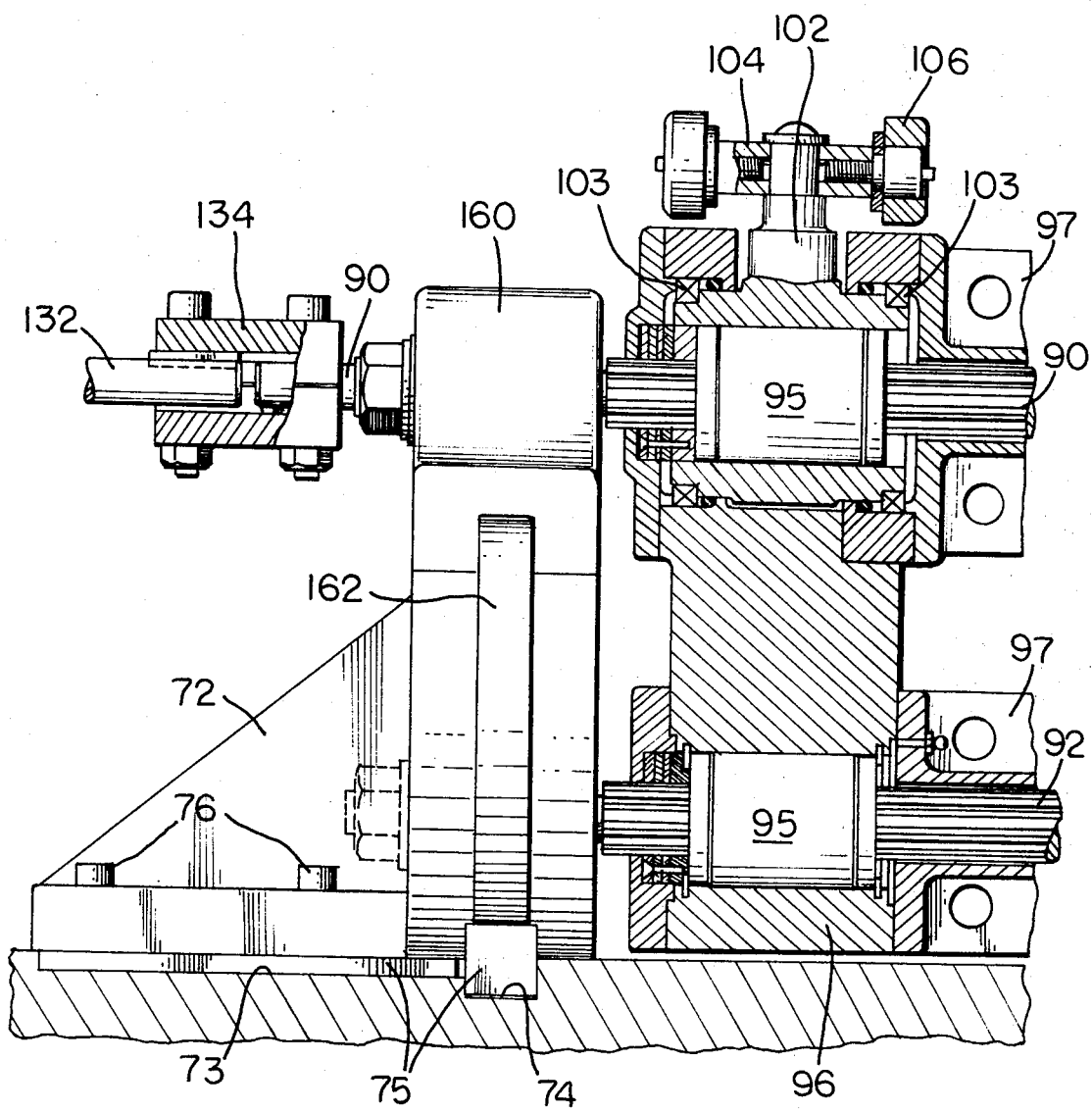
FIG. 8A is a view showing the feeding device from the side at one end thereof and partly in cross section.
Figure 8B:
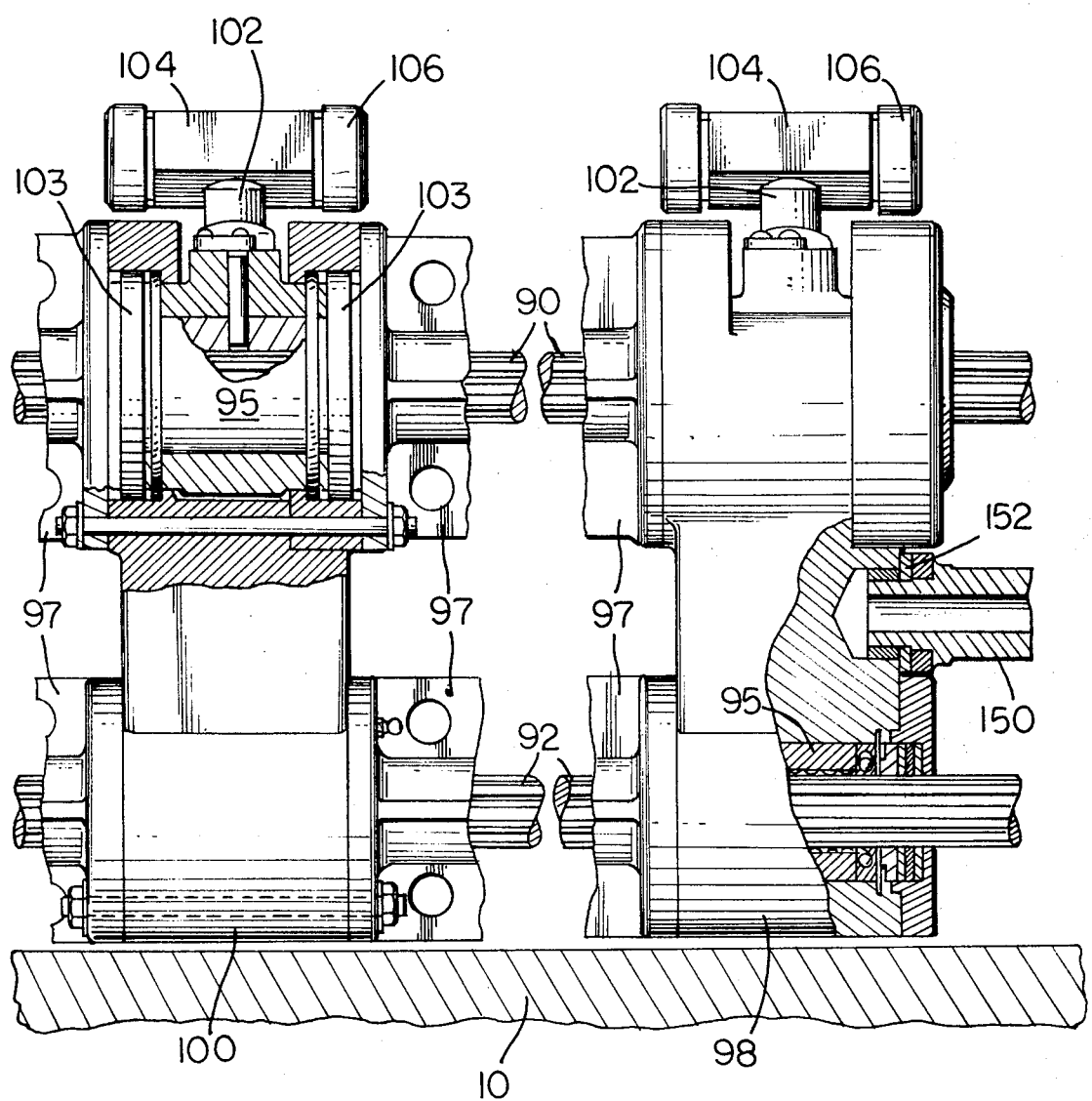
FIG. 8B is a view like FIG. 8A but shows the center portion of the feeding device and is also partly in cross section.
Figure 8C:
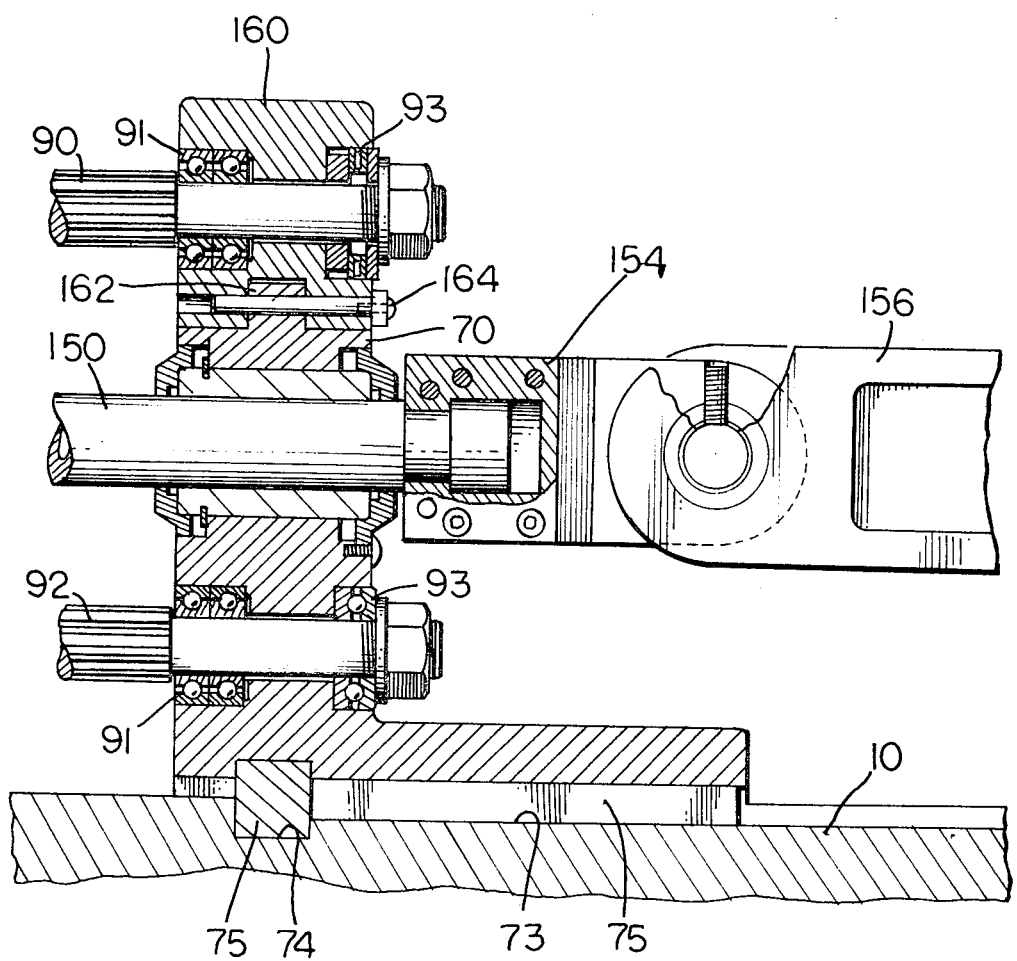
FIG. 8C is a view showing the feeding device from the side at the other end of the feeding device and is also partly in cross section.

As will be seen in FIGS. 8A and 8B, the bearing supporting portions 96, 98 and 100 are connected by tubular portions 97 so that each frame member, while light in weight, is strong and rigid. The bearings contained in said bearing portions for the shafts are preferably in the form of ball nuts 95 having infinite pitch and the shafts 90 and 92 are, therefore, provided with external splines for nonrotatively engaging the respective ball nuts 95.

According to the present invention, at least the ball nuts 95 in the ends of each frame member pertaining to the upper shaft 90 extending through the respective frame member are adapted for being adjusted relatively angularly about the axis of the said shaft and clamped in adjusted positions thereby to hold the said upper shaft in torsion and thereby to eliminate lost motion between the shaft and the ball nuts.

This arrangement is resorted to because each of the ball nuts pertaining to the upper shaft of each frame member has connected thereto and extending upwardly through the top of the frame member an actuating lever 102. Each actuating lever 102 is rotatably supported in the respective frame member by antifriction bearings 103 and at its upper end has connected thereto a laterally extending cross head 104 which pivotally receives the bifurcated rear end of a link 106. Each link 106 extends toward space 80 and at its end adjacent space 80 is connected by spherical pivot joints 108 with a bar-like carrier member 110 slidably resting on top of the adjacent rail region 78.

Each carrier member 110 is retained in sliding engagement with its rail region 78 by clamp elements 112 pivoted at 114 to respective blocks 116 mounted at the sides of the rail region 78. Screws 118 extending through the clamp elements into blocks 116 hold the clamp elements down against the carrier members. The carrier members 110 may be provided with hardened wear plates on top thereof, if desired.

It will be evident, however, that releasing of screws 118 will permit the carrier members 110 and links 106 to be swung upwardly about the pivotal connections of the links with the upper ends of levers 102 so as to expose the adjacent side of space 80.

Connected to carrier members 110 and extending therefrom toward the center of space 80 are the workpiece engaging elements 120 contoured on the inner ends to engage workpieces in the respective stations. The workpiece engaging elements on each carrier member are spaced the same distance as the stations distributed along space 80 and are in opposed relation to those carried by the other carrier member.

At this point it will be appreciated that rocking of the upper shafts 90 in the frame members 96, 98 and 100 will cause rocking of the levers 102 connected therewith and, through links 106, effect movement of the carriers 110 and the workpiece engaging elements 120 mounted thereon transversely of the center line of space 80. Also, it will be evident that longitudinal movement of the aforementioned frame members 96, 98 and 100 in a direction parallel to space 80 will cause movement in the same direction of the carrier members 110 and the work engaging elements 120 mounted thereon.

Rocking of shafts 90 is accomplished by the arms 130 mounted on the shafts 132 which are detachably connected by coupling blocks 134 to the shafts 90. Each arm 130 is connected with a respective one of arms 68 by a link 140 made in the form of a turnbuckle, as shown in FIG. 7, so as to be adjustable in length. Due to the adjustable length of links 140, arms 68 can oscillate between predetermined fixed limits and the precise limits of oscillation of workpiece engaging elements 120 can be adjusted relative to the center line of space 80.

As to the reciprocation of frame members 96, 98 and 100 at the ends thereof adjacent drive unit 38, each frame member has connected thereto a rod 150 extending axially therefrom and slidably guided in the adjacent main frame member 70. Preferably, the frame member end of each rod 150 is clamped to the respective frame member with an adjustable spacer member 152 interposed between the frame member and the pertaining rod.

Each rod 150 is connected by coupling 154 with a link 156 extending to the outer end of a respective arm 44 pertaining to drive unit 38 and pivotally connected thereto. It will be appreciated that oscillation of arms 44 will effect reciprocating movement of the frame members while the precise end positions of the frame members can be adjusted by the selection of the thickness of spacer members or washers 152.

The bearings 91 and 93 at the opposite ends of upper shafts 90 are carried in blocks 160 which form a part of the aforementioned frame members 70 and 72. The portion of each of the frame members 70 and 72 on which blocks 160 rest is formed with an arcuate guide way 162 concentric with the axis of the respective lower shaft 92 and each block 160 is slidable on a respective guide way 162. Means are provided in the form of a pull out dowel pin, for example, as indicated at 164, for releasably locating each block in the position wherein the shaft 90 pertaining thereto is in its upper operative position as illustrated in the drawings. Screws 165 clamp each block 160 in the upper position thereof on the respective frame members 70, 72.

However, by removing screws 165 and by pulling dowels 164, and uncoupling rods 150 from the frame members, and uncoupling shafts 90 from shafts 132 by opening the couplings 134, and releasing clamp elements 112, each frame member together with the carrier member 110 connected thereto and the workpiece engaging elements 120 can be swung outwardly away from space 80 thereby to expose the space for installation, removal, repair, or adjustment of dies mounted therein.

It will be appreciated that the individual work engaging elements can be varied as to the precise size and configuration thereof to take into account changes in contour of the workpiece as it advances through the several work stations.

In operation, the said device is timed relative to the press so that, as the press slide moves upwardly, the carrier members and the work engaging elements of the feed device move in unison toward each other and grip therebetween the workpieces extending along the center line of the path along which the work stations are arranged. During continued upward movement of the press slide, the carrier members and frame members of the feed device are advanced laterally in the press a distance equal to the space between adjacent stations.

At about the time the press slide begins its downward stroke, the workpieces are accurately located in advanced position and the carrier members and work engaging elements retract outwardly and release the workpieces. The frame members and carrier members then move backwardly to the original position thereof during further downward movement of the press slide, preparatory to a new cycle of operations.

Modifications may be made within the purview of the appended claims.

What is claimed is:

1. In a transfer mechanism for moving workpieces step by step from an incoming station into a plurality of work stations in sequence and then to an outgoing station, said stations being spaced uniformly along a path; said mechanism comprising a main frame defining the said path, a frame member on each side of said path, guide means including two pairs of parallel guideways carried by the main frame guiding said frame members for reciprocation parallel to said path, said guideways having a pair of shafts provided with angularly adjustment means to place such shafts in torsion to eliminate lost motion in said shafts, first means connected to said frame members for reciprocation thereof in unison between first and second end positions spaced substantially the same distance as adjacent stations, workpiece engaging elements carried by said frame members to reciprocate therewith and movable thereon laterally of said path, the said elements on said frame members being distributed therealong in opposed relation at the same spacing as said stations, second means for moving said elements in unison on said frame members laterally toward and away from said path alternately to grip workpieces in said station and to release workpieces to said stations, and third means operatively interconnecting said first and second means for operation thereof in timed relation to advance workpieces step by step from said incoming station to said work stations in sequence and finally to said outgoing station.

2. A transfer mechanism according to claim 1, in which said guide means comprises two pairs of shaft means carried by said main frame parallel to said path on each side thereof and slidably supporting said frame members.

3. A transfer mechanism according to claim 1, in which said guide means for each frame member comprises a pair of parallel shafts supported in said main frame in vertically upper and lower spaced relation, each frame member comprising a hollow box-like structure having bearing means therein slidably engaging the respective shafts.

4. A transfer mechanism according to claim 3, in which the upper one of the shafts for each frame member is connected to said second drive to be actuated thereby, a plurality of levers in longitudinally spaced relation in each frame member and rotatable thereon, said levers being nonrotatively connected to the respective upper shaft, a carrier member parallel to said path on each side thereof and having the adjacent said workpiece engaging elements connected thereto, said main frame including means for guiding said carrier members thereon for movement laterally of said path and parallel to said path, and links connecting the said levers of each frame with the adjacent said carrier member.

5. A transfer mechanism according to claim 4, in which said means for guiding said carrier members comprises upwardly facing surfaces on said main frame on each side of said path on which said carrier members slidably rest and clamp elements movably connected to said main frame and overlying said carrier elements, said links of each said frame member being pivotal on the respective said levers about a common axis parallel to said path whereby releasing of said clamp elements will permit said carrier members and the said elements carried thereby to be pivoted upwardly and outwardly away from said path.

6. A transfer mechanism according to claim 5, in which said main frame includes a support block supporting each end of the upper one of the shafts for each frame member, means guiding each block for movement about the axis of the adjacent lower one of said shafts away from said path and downwardly, and releasable means detachably retaining each block on said main frame within the position wherein the respective upper shaft is in operative position, said clamp elements and releasable means being releasable for bodily pivoting of each said frame member and the respective carrier members and the work engaging elements thereon about the axis of the respective lower shaft.

7. A transfer mechanism according to claim 6, in which said first means is detachable from said frame members and said second means is detachable from said upper shafts for completely freeing said frame members for pivoting movement about the respective lower shafts to expose the region along said path adjacent to said stations.

8. A transfer mechanism according to claim 4, in which said second drive includes oscillatory output shaft means and drive arms thereon, other arms connected to the said upper shafts, and links interconnecting each drive arm with a respective said other arm and adjustable in length to permit precise adjustment of the limits of lateral movement of said carrier members and the said workpiece engaging elements carried thereby.

9. A transfer mechanism according to claim 4, in which at least said upper shafts are splined and said bearings are in the form of circulating ball nuts with infinite pitch, one of said nuts being disposed near each end of the respective frame member and being rotatable in the frame member and supporting a respective one of the said levers.

10. A transfer mechanism according to claim 9, in which each frame member includes at least one further ball nut rotatable therein and nonrotatively engaging the respective said upper shaft and supporting a further one of said levers.

11. A transfer mechanism according to claim 3, wherein bearings are provided for at least the upper one of each pair of shafts in the form of ball nuts near the ends of the respective frame members forming a torsion coupling with the respective shaft, and means for adjusting said nuts circumferentially to place the respective shaft in torsion.

12. A transfer mechanism according to claim 11, which includes ball joints on at least one end of said links connecting the links with said carrier members.

* * * * *

UNITED STATES PATENT OFFICE
CERTIFICATE OF CORRECTION

Patent No. 3,704,775  Dated December 5, 1972

Inventor(s) Frank C. Eickenhorst

It is certified that error appears in the above-identified patent and that said Letters Patent are hereby corrected as shown below:

Col. 1, line 30, "to" omitted between "thereto" and "the"

Col. 1, line 56, "deice" should be --- device ---.

Col. 8, line 4, (Claim 4) - "member" omitted between "frame" and "with".

Signed and sealed this 1st day of May 1973.

(SEAL)
Attest:

EDWARD M. FLETCHER, JR.  ROBERT GOTTSCHALK
Attesting Officer  Commissioner of Patents